Jan. 14, 1941.     W. H. GREENLEAF     2,228,874
SCALE
Filed Oct. 16, 1936     3 Sheets-Sheet 1
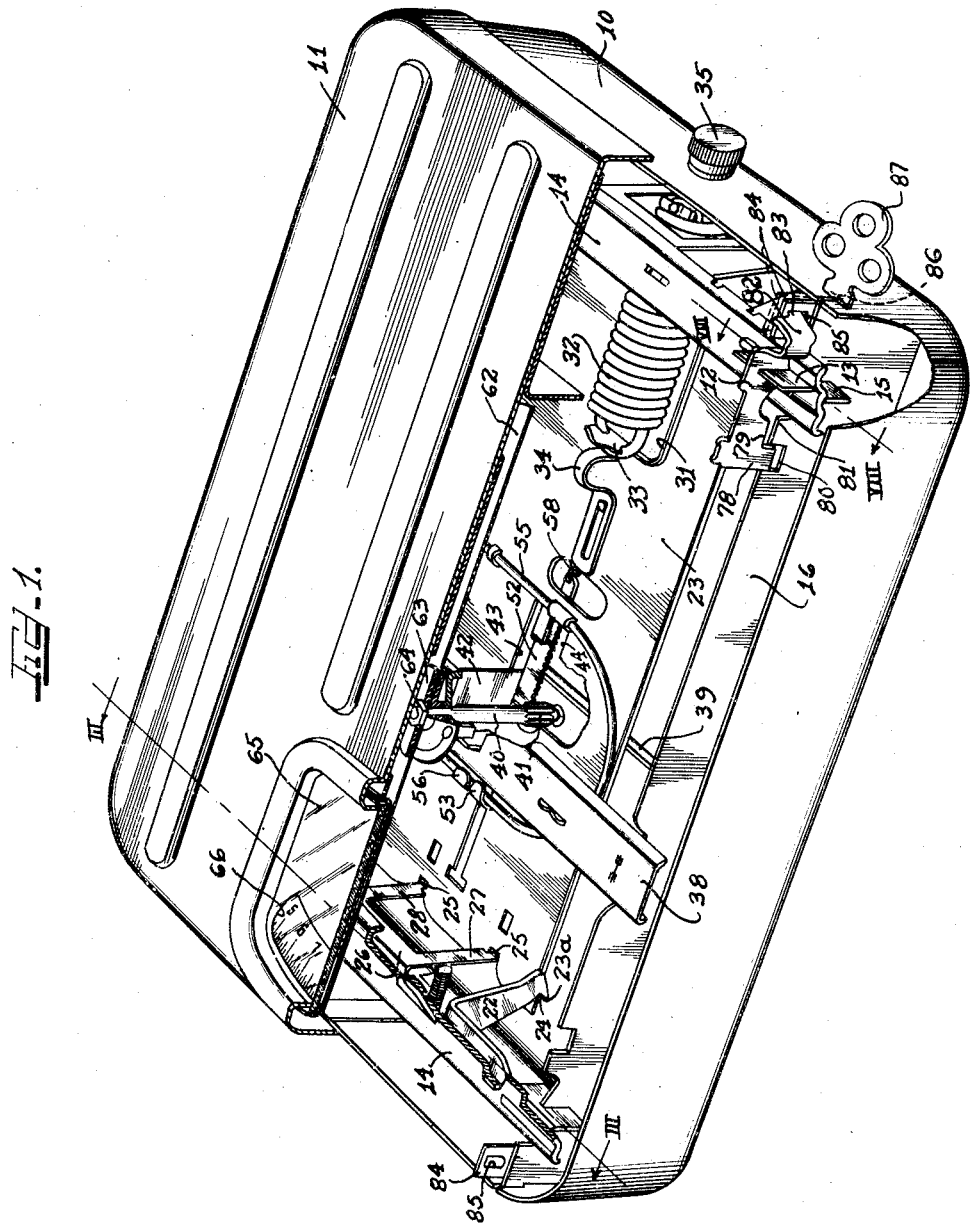

Jan. 14, 1941.   W. H. GREENLEAF   2,228,874
SCALE
Filed Oct. 16, 1936   3 Sheets-Sheet 2
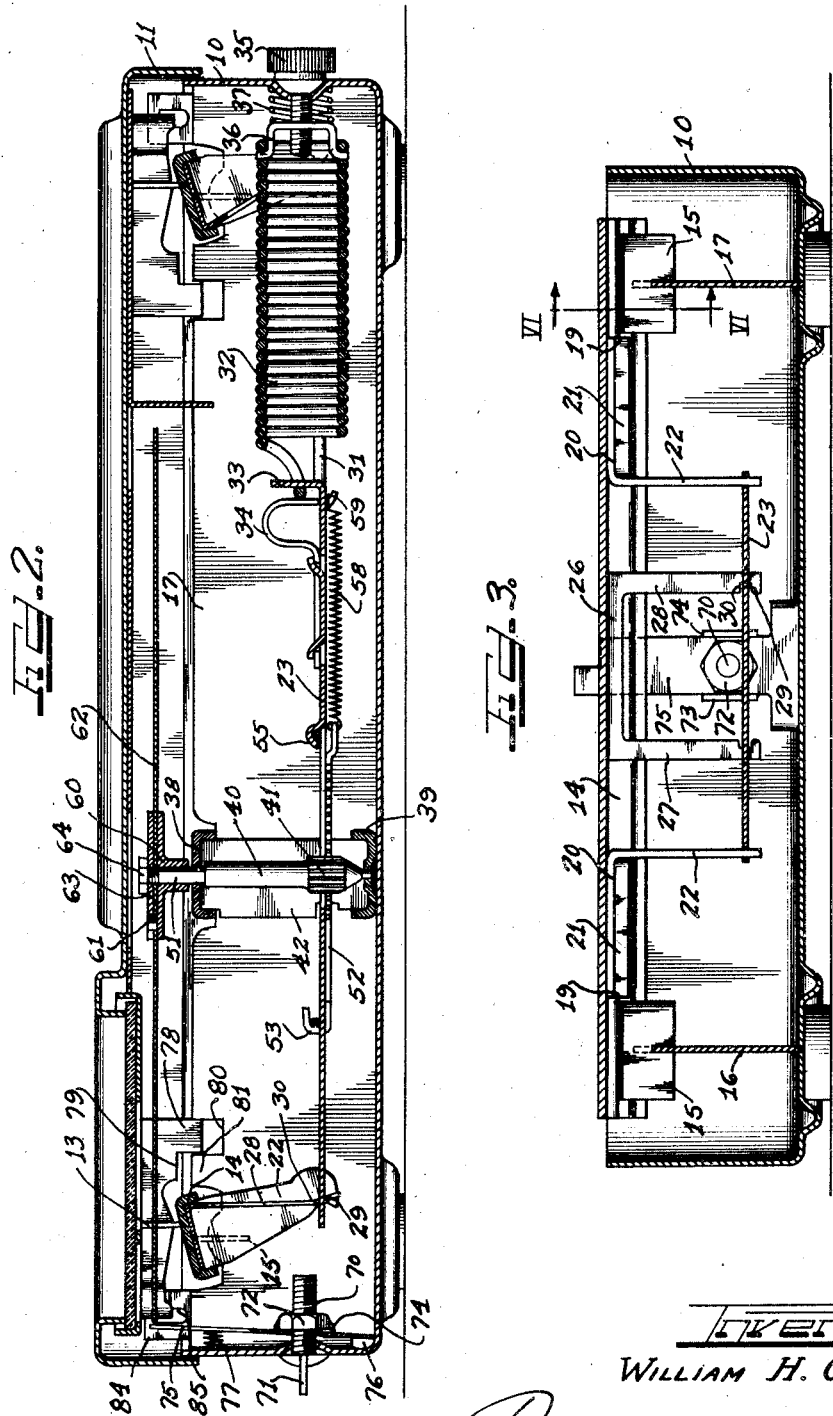
Inventor
WILLIAM H. GREENLEAF.
by Charles O'Hill Attys.

Jan. 14, 1941. W. H. GREENLEAF 2,228,874
SCALE
Filed Oct. 16, 1936 3 Sheets-Sheet 3
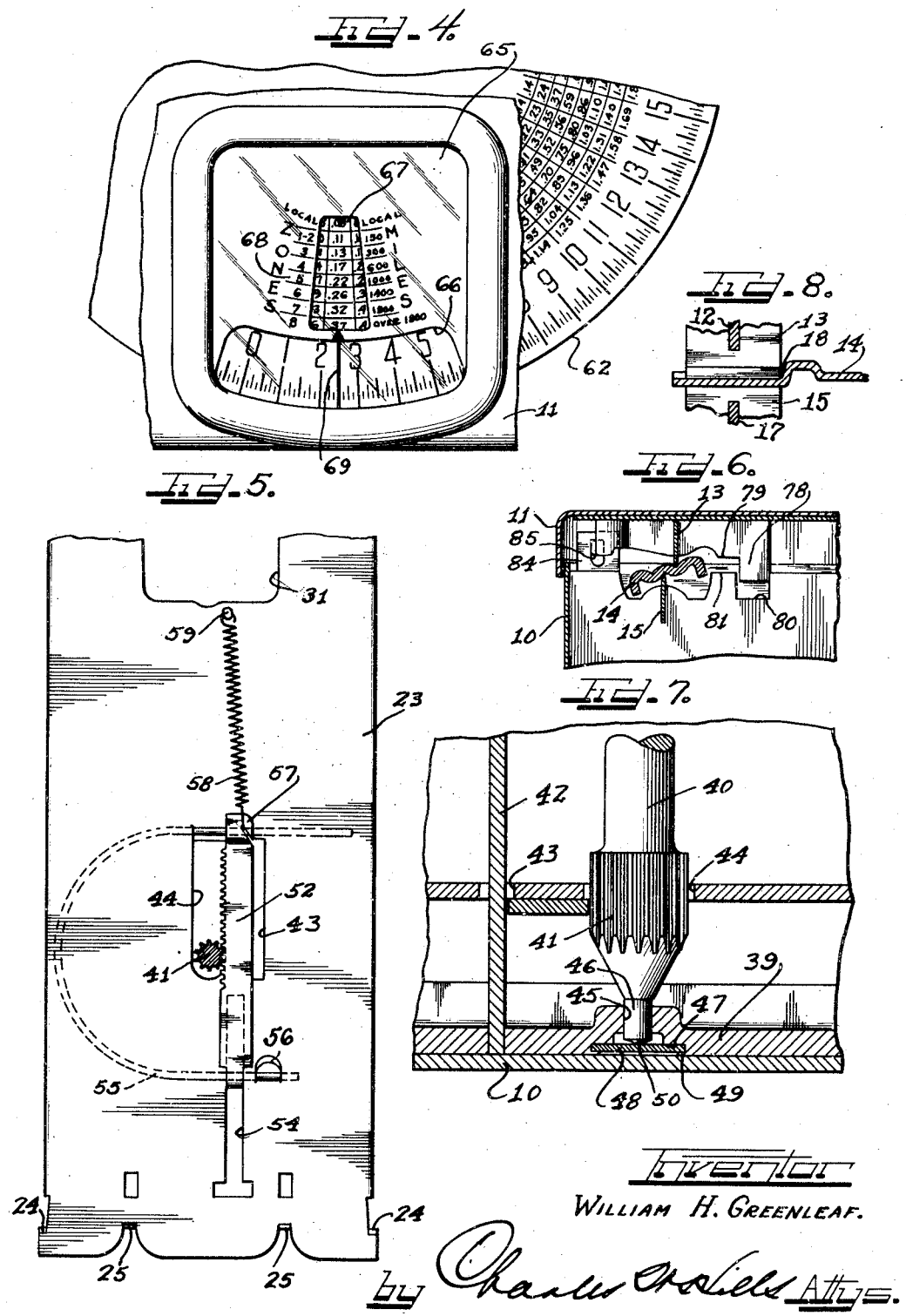

Patented Jan. 14, 1941

2,228,874

UNITED STATES PATENT OFFICE 2,228,874

SCALE

William H. Greenleaf, Chicago, Ill.

Application October 16, 1936, Serial No. 105,876

14 Claims. (Cl. 265—68)

The present invention relates in general to a weighing scale and is more particularly concerned with scales of the portable type such as may be used in the home, in offices for weighing mail, parcel post, etc., and many other places where an exceedingly compact and extremely accurate scale may be desired. A scale of this type is disclosed in my Patent No. 2,047,681, which issued July 14, 1936, and which discloses a construction of which the present invention seeks to provide improvements and refinements.

A primary object of the present invention is to provide a scale of such construction that it will withstand the rigors of shipment and rough handling without impairment of its ability to weigh accurately.

A further object of the invention is to provide in a scale of this type novel means for locking the weight indicator in indicating position, thus enabling the weight of an object to be read after the object is removed from the scale.

A further object is to provide improved means for guiding the movement of the scale platform and for preventing the weighing mechanism from being subjected to overload stresses, when the capacity of the scale is exceeded.

A further object is to provide in a scale of this type improved means for interlocking the scale platform against removal, said means being key actuated.

Another object is to provide in a scale having an equalizer member, improved means for supporting the equalizer member, whereby the friction of the support for the equalizer will be maintained at an extremely low value, and the equalizer will be readily retained against displacement from its operating position.

A still further object is to provide in a scale improved rack and pinion driving mechanism for the weight indicator.

It is also an object to provide in a device of the herein described type, shock absorbing means whereby forces resulting from sudden changes in the weight on the scale will be cushioned and not transmitted directly to the weight indicator.

A further object has to do with the provision of improved means for preventing backlash in the connection between the main weight resisting spring and the weight indicating mechanism.

A still further object is to embody in a scale mechanism of the herein described type, an improved knife edge and notch pivot arrangement.

Other objects and features of the invention will more fully appear from the following detailed description taken in connection with the following drawings which illustrate a single embodiment thereof, and in which:

Figure 1 is an isometric view of a scale embodying the features of the herein described invention, a section being taken through the scale platform and certain portions being cut away to disclose the operative relationship of the scale parts;

Figure 2 is a longitudinal section through the same;

Figure 3 is an enlarged transverse section, the scale platform being removed, taken substantially on line III—III of Figure 1;

Figure 4 is an enlarged fragmentary plan view of a section of the platform, showing the window therein and details of the scale indicia which are brought into view through said window during a weighing operation;

Figure 5 is an enlarged fragmentary detailed view showing the mounting and operative relationship of the rack and pinion connection to the equalizer plate;

Figure 6 is an enlarged fragmentary sectional view showing details of the platform locking and guiding means and the linkage for transmitting movement of the platform to the weight indicating mechanism, taken substantially on the line VI—VI of Figure 3, the platform being applied thereto;

Figure 7 is an enlarged fragmentary sectional view showing the bearing support for the dial arbor; and Figure 8 is a detailed sectional view of one of the knife edge and notch pivot supports, illustrating improved means for preventing longitudinal movement of the knife blade in one direction in the associated notch, taken substantially on the line VIII—VIII of Figure 1.

As illustrated in the drawings, the scale of the present invention embodies a substantially rectangular casing 10, in which the scale mechanism is enclosed, this casing being provided with a platform cover 11 of such size as to permit free vertical movement of the platform independent of the case under the weight of an object placed thereon to be weighed.

For supporting the platform, corner brackets 12 are rigidly secured so as to depend from the underside of the corner. Each of these brackets forms a support for a knife edged pivot member 13 arranged to rest in a V-shaped groove of a rocker member 14.

In the disclosed arrangement, the knife edged members 13 at each end of the platform are in longitudinal alignment and are respectively disposed in V-shaped grooves formed at opposite ends of a common rocker member, a rocker member being disposed at the respective ends of the platform. Each rocker is also provided with laterally displaced grooves at its opposite ends on its under surface for receiving knife edged bearing members 15 which are supported adjacent the ends of laterally spaced parallel rails 16 and 17 which are rigidly secured along their lowermost edges to the bottom of the casing.

It is to be noted that the knife-edged pivot members 13 and 15 differ in their construction and the manner in which they are mounted from the usual arrangements. In the present arrangement, the pivot members are of relatively thin plate construction and are each provided with a central notch halved into a notch in its associated supporting bracket or parallel rail. With the usual manufacturing tolerances employed, the pivot members thus mounted will not be rigidly held in position, but will be enabled to tilt slightly in either a longitudinal or lateral direction. By floatingly mounting the pivot members in this manner, they become self-aligning, and their knife-edges will be properly seated in their associated V-grooves for most efficient operation of the device.

As shown in Figure 8, the innermost ends of the grooves associated with the knife edged pivot 13 are provided at their innermost ends with an abutment surface 18 which is inclined outwardly from the bottom to the top of the grooves. The members 13, which are commonly associated with a rocker 14, are so spaced that the innermost ends of the members 13 are closely disposed to the portion of the abutment surface at the bottom of the associated grooves. With this arrangement, lateral displacement of the platform will be limited, and due to the abutment surface being inclined as described, there will be little or no friction between the member 13 and the abutment surface under normal conditions of operation.

In the case of the bearing member 15, abutment surfaces are provided at the ends of their associated grooves by the ends 19—19 of angular members 20, these members having a leg 21 which is secured to the rocker member and a leg 22 which depends below the rocker member and forms at each rocker member a pair of spaced supports for one end of an equalizer plate 23 which is movable in a substantially horizontal plane below the platform.

The legs 22 are correspondingly provided with notches 23a for receiving an adjacent knife edge 24 formed at the lateral edge of the equalizer plate.

In alignment with the lateral knife edges 24 of the equalizer plate are intermediate spaced apart knife edges 25 which extend in the opposite direction from the knife edges 24.

Secured to each rocker is a spring member 26 having a pair of depending spaced arms 27 and 28, which are adapted to resiliently bear against the knife edges 25—25. The lowermost ends of the arms 27 and 28 are respectively notched to define abutment edges 29 and 30, which are closely spaced below and above the equalizer plate.

The arms 27 and 28 operate to maintain the lateral knife edges resiliently seated in their associated notches, and since the knife edges 24 and 25 are all in alignment, there will be little or no additional friction due to the effects of springs 27 and 28. In case of an abnormal force tending to unseat the lateral knife edges from their associated notches, one or the other of the abutment edges 29 and 30 will be engaged, whereby excess movement of the equalizer plate is limited.

An end opening 31 is provided at one end of the equalizer plate for the main weighing spring 32. A stud 33 is provided in the plate at the innermost end of the opening 31 for receiving thereover one end of the spring 32. This end of the spring is resiliently retained in engagement with the lug by means of a backlash spring member 34 which is rigidly secured at one end to the equalizer plate and has its free end in engagement with the end of the main spring. The opposite end of the main spring is connected to a zero adjusting screw 35 having its threaded shank extending through the wall of the case and threadedly engaging a yoke 36 having its opposite ends engaged between the coils of the spring. A spring 37 surrounds the shank of the adjusting screw and has one end bearing against the case and its other end bearing against the yoke, whereby the screw is held against loose movement within the case. Disposition of the head of the adjusting screw 35 outside the case enables the scale to be readily and easily adjusted so as to correctly indicate zero, when there is no weight disposed on the platform.

Interconnecting the side rails 16 and 17 are upper and lower channel members 38 and 39, which form a support for an arbor 40 which is provided with a driving pinion 41. In order to rigidly maintain the members 38 and 39 in properly spaced position, there is disposed an interconnecting plate 42 adjacent the arbor. Slots 43 and 44 are provided in the equalizer plate for the pinion and member 42 so that the equalizer plate may be reciprocated longitudinally.

The bearing for the lower end of arbor 40 is provided in the lower channel member 39. As shown clearly in Figure 7, the channel member is shaped to define a cup-shaped portion having an aperture 45 through the bottom thereof for receiving a contracted end 46 of the arbor, this contracted portion projecting into the interior of the cupped portion as shown. At the open end of the cupped portion there is provided an annular seating shoulder 47 for a disk 48 which is secured in position by peening over the edge of the channel as shown at 49. This disk forms a thrust bearing for the end of the contracted portion 46 of the arbor which is rounded as shown at 50. The disk may be of any suitable hard bearing material, and for this purpose we have found a very hard steel to be very satisfactory. In practice, the interior of the cupped portion is filled with oil so as to prevent rusting and provide lubrication.

The upper end of the arbor is contracted as shown at 51 and extends through a suitable aperture in the uppermost channel member 38.

Meshing with the pinion 41 is a rack 52 which is supported on the equalizer member for longitudinally sliding movement as shown in Figure 5. One end of the rack is deflected to form a hook 53 which extends through a slot 54 extending longitudinally of the equalizer plate. This rack, which is wider than the slot 54, is disposed on the underside of the equalizer plate, and the hook 53 above the plate is engaged by the free end of a U-shaped spring 55 which is anchored at its other end in the plate 23.

Midway of the slot 54 there is provided at one side a hook 56 in the equalizer plate, which is adapted to be engaged by the free end of the spring 55. This end of the spring is normally in resilient engagement with the hook 56, but is, of course, free to be deflected in the opposite direction.

The opposite end of the rack 52 is slotted to define a hook 57 for receiving thereover one end of a light coil spring 58 having its opposite end anchored as at 59 to the equalizer plate. This spring acts to move the rack in the opposite direction from that in which it is moved by spring 55 and normally maintains the hook 53 thereof in engagement with the free end of spring 55. However, it will be noted that, when the spring 55 is against hook 56, the rack is free to move from its normal position in a direction in which the hook 53 will be carried out of contact with spring 55, in which case the movement will be against the action of spring 58 only.

Springs 55 and 58 are utilized to cushion the forces transmitted from the rack 52 to pinion 41, when a weight is suddenly placed on the platform or removed therefrom. Due to the inertia of the pinion 41, its arbor and parts carried thereby, movement of the pinion will tend to lag behind movements of the equalizer plate, and, if the rack were rigidly secured to the equalizer plate, abnormal stresses would be applied to the rack and pinion with possible damaging effect, when a weight is suddenly applied or removed from the platform.

By mounting the rack on the equalizer plate as described above, such a condition is obviated. It will be seen that, when a weight is suddenly applied to the platform, the equalizer bar would be forcibly moved to the left, as viewed in Figure 5, with a sudden jerk. This movement, due to the inertia of the pinion 41 and parts connected thereto, will cause the rack movement to lag, whereupon it will move to the right relative to the equalizer plate and the shock forces will be absorbed in the spring 55, the free end of which will be moved away from the hook 56. Thereafter, the spring returns to its normal position against the stop hook, and in doing so expends its energy in driving the pinion 41.

When a weight is suddenly removed from the platform, the equalizer plate will be moved towards the right. In this case, the shock forces are taken by the spring 58, which is tensioned by the relative movement between the rack and the equalizer plate. Thereafter the smaller energy of spring 58 is expended to return the rack to normal position during which it drives the pinion 41.

The end 51 of the arbor is fitted with a hub 60 having a plurality of projecting studs 61 extending from its upper surface. In practice it has been found satisfactory to provide two of these studs which are diametrically disposed and are adapted to extend through appropriate apertures in a dial plate 62. A clamping disk 63 is arranged with a central aperture for receiving the end of the arbor therethrough and apertures for receiving the ends of the studs 61. The clamping member is actuated into clamping position by means of a nut 64 which threadedly engages the end of the arbor. This hub serves to positively hold the dial plate against movement relative to the arbor, and the hub and clamping member also operate to reinforce the dial at its central portion so that it is less easily deflected.

The dial plate is provided on its upper surface with circumferentially spaced graduations for indicating the number of pounds being weighed.

When it is desired to use the scale for weighing of mail, parcel post, or the like, the dial may be provided with additional indications to show the amount of postage necessary for different zones. In the arrangement for a parcel post scale, the platform is provided with a window portion 65 overlying an arcuate opening 66 through which the pound scale is visible, and a radially extending opening 67 through which the numerals representing the amount of postage necessary for different zones are visible. Zone indicating indicia corresponding to the various values of postage for a given weight are disposed along the side of opening 67 as shown at 68. An indicating pointer 69 is provided to facilitate reading of the pound scale and to indicate the postage bracket which should be read for the indicated weight.

It has been found desirable in certain types of portable scales, particularly in a scale for use in weighing parcel post packages, to provide means for locking the indicator in indicating position. This is especially convenient in the case of large packages which would cover up the window 65 in the platform and prevent reading the indicated weight and the amount of postage necessary. For this purpose, a novel dial locking arrangement is provided. At the opposite end of the case from the zero adjusting screw 35 there is arranged a screw 70 having its shank extending through the case and its head disposed outside the case, the end of the screw being provided with a wing 71 by means of which the screw may be turned through a partial revolution. Inside the case, there is threadedly associated with the shank of the screw a nut 72 which is retained against rotative movement by lateral or side flanges 73 and 74 formed on a rockingly supported member 75.

The shank of the screw extends through a suitable aperture intermediate the ends of this member. The lowermost end of member 75 is laterally extended in opposite direction and deflected to form spaced rockers, one of which is shown at 76, upon which the member 75 may be pivoted. The member 75 is disposed between the nut 72 and the associated wall of the case, and a spring 77 is placed adjacent the free end of member 75 to normally force the member in a direction to hold it in engagement with nut 72. The uppermost end of the member 75 is arranged to move into and out of engagement with the peripheral edge of the dial 62, when the screw is turned by means of the wing 71.

Assuming that an object has been placed on the platform and it is desired to lock the dial in weight indicating position, the wing 71 is rotated to such position as to bring the free end of member 75 against the dial, whereby the dial is frictionally held against movement. If the object is now removed from the platform, the main spring will return the platform and equalizer plate to normal position, but since the dial, and consequently the pinion 41, is held against movement, the rack 52 cannot move relative to the pinion. However, the equalizer bar in moving to normal position will stress spring 58 so that only a small amount of force is applied against the pinion and the large returning force of spring 32 will not be applied against the rack and pinion. As soon as the dial is released by moving the wing 71 in the opposite direction, the spring 58 will return the rack 52 to normal position with its hook 53 bearing against spring 55, thus bringing the dial back to the zero position.

Novel means are provided for guiding the movement of the platform and preventing lateral displacement of pivot members 13 from their associated grooves. There is integrally formed with each of the brackets 12 a tooth or projection 78 which defines an abutment edge 79. The tooth 78 extends into a notch 80 in the adjacent portion of the associated side rail, this notch defining a tooth 81 which presents an abutment edge for the edge 79. The tooth 78 and notch 80 cooperate to guide the movement of the platform and prevent its endwise displacement when the scale is tilted. The abutment edge 79 and the abutment edge of the tooth 81 are arranged to engage each other and prevent abnormal downward movement of the platform when a weight is placed thereon, which exceeds the capacity of the scale. The weight of an object exceeding the capacity of the scale will be supported through the brackets 12 and associated rail members directly by the scale support, and forces exceeding the capacity of the scale will not be transmitted to the weight indicating mechanism.

The platform is locked to the casing in an ingenious manner, as follows. The brackets 12 at one end are deflected to form a U-shaped portion 82 which terminates at its end in a finger portion 83. Secured at one end to the associated side rail is a leaf spring 84 which is apertured as shown at 85 to normally receive therethrough finger 83. It will be apparent that if the spring member is deflected to the position shown in dotted lines in Figure 1, the finger 83 is disengaged, thus permitting the platform to be removed relative to the casing. For releasing the platform, the casing adjacent the end portion of the side rail is provided with an opening 86 through which the shank of a suitable key 87 may be inserted, the shank of this key being provided with a wedge shaped finger which will enter between the spring member and associated side rail and deflect the spring member to release the finger. By inserting a key at each corner of the case as just described, the platform may be readily removed from the case. The platform is conversely secured in place by setting it in the proper position and withdrawing the keys.

From the foregoing description, it will be apparent that the present invention provides a novel scale construction that will withstand rigorous treatment without impairment of its weighing accuracy; which has novel means for locking the weight indicator so that the weight of an object may be read after the object is removed from the scale; which is provided with novel means for guiding the movement of the scale platform and preventing overloading of weighing mechanism; which utilizes novel key locking means for securing the platform against removal from the casing; which supports an equalizer plate in an anti-friction connection which is held against major displacement; which includes improved means for absorbing shocks, whereby forces resulting from sudden changes in the weight on the scale will be cushioned and will not be transmitted directly to the weight indicator; which has improved means for preventing backlash in the connection between the main weight resisting spring and the weight indicating mechanism; and in which an improved knife edge and notch pivot arrangement is utilized.

Now, it is of course to be understood that although I have described in detail the preferred embodiment of my invention, the invention is not to be thus limited, but only insofar as defined by the scope and spirit of the appended claims.

I claim as my invention.

1. In a weighing scale, a casing, a movable platform associated with said casing for receiving an object to be weighed, a support in said casing, a knife edge pivot on said support, a bracket depending from said platform, a second knife edge pivot mounted on said bracket, a rocker member having V-shaped notches operatively associated with said pivots, weight indicating means responsive to the movement of said rocker, interfitting portions on said support and bracket for guiding and limiting the movement of the platform, a projection formed on said bracket, a spring pressed member mounted on said support arranged to lockingly engage said projection, whereby the platform is secured relative to said casing, said spring pressed member being operable to unlocked position relative to said projection by means of a suitable key.

2. In a weighing scale, a pair of spaced rocker members, a weighing platform disposed above and supported on said members, an equalizer member disposed below and interconnecting said rocker members, notch and knife edge connections between the equalizer member and the respective rocker members, and spring means at each rocker member for resiliently maintaining the associated knife blade and notch connection in engagement.

3. In a weighing scale, a pair of spaced rocker members, a weighing platform disposed above and supported on said members, an equalizer member disposed below and interconnecting said rocker members, notch and knife edge connections between the equalizer member and the rocker members, said connections being rectangularly disposed, and a spring carried by each rocker and bearing against the equalizer member for maintaining said connections at each rocker in resilient engagement.

4. In a weighing scale, a platform for receiving an object to be weighed, a rocker member supporting said platform and responsive to its movement, a plate member longitudinally movable in a plane parallel to the platform, laterally disposed knife edges on said plate extending in the same direction, a knife edge disposed between said lateral knife edges and extending in the opposite direction, said edges being in alignment, a pair of spaced arms carried by said rocker and having V-shaped notches respectively associated with the lateral knife edges, and a leaf spring carried by said rocker with an end bearing against the other knife edge, whereby the lateral knife edges and notches are resiliently retained in operative relationship.

5. In a weighing scale, a platform for receiving an object to be weighed, a rocker member supporting said platform and responsive to its movement, a plate member longitudinally movable in a plane parallel to the platform, laterally disposed knife edges on said plate extending in the same direction, a knife edge between said lateral knife edges extending in the opposite direction, said edges being in alignment, a pair of spaced arms carried by said rocker and having V-shaped notches respectively associated with the lateral knife edges, a leaf spring carried by said rocker with an end bearing against the other knife edge, whereby the lateral knife edges and notches are resiliently retained in operative relationship, and a deflected portion at said end of said spring arranged to extend below the plate in closely spaced relation thereto, whereby excessive displacement of the plate end away from the associated rocker is limited.

6. A weighing scale comprising a weighing platform, spaced rockers supported on said platform, an equalizer member connecting said rockers, whereby movement of the platform is transmitted to the equalizer member, means resisting the movement of the equalizer member, a weight indicating element, a rack and pinion connection between said member and element, and means resiliently mounting said rack relative to said pinion.

7. A weighing scale comprising a weighing platform, spaced rockers supporting said platform, an equalizer member connecting said rockers, whereby movement of the platform is transmitted to the equalizer member, means resisting the movement of said member, a weight indicating element, a rack and pinion connection between said element and said member, means mounting said rack on said member for limited movement relative thereto in one direction from a normal position, and spring means for resisting said relative movement.

8. In a weighing scale, a member longitudinally shiftable in response to the weight of an object to be weighed, weight indicating means including a pinion, a rack meshing with said pinion, said rack being mounted on said member for movement relative thereto in opposed axial directions from a normal position, a first U-shaped spring opposing movement of the rack in one direction from normal position, said spring being anchored at one end to said member and having its other end bearing against the rack, a second spring for opposing movement of the rack in the opposite direction from normal position, and means rendering the first spring ineffective during said latter movement.

9. In a weighing scale, a member longitudinally shiftable in response to the weight of an object to be weighed, weight indicating means including a pinion, a rack meshing with said pinion, said rack being mounted on said member for movement relative thereto in opposed axial directions from a normal position, a relatively heavy normally stressed spring opposing movement of the rack in one direction from normal position, said spring being U-shaped and anchored at one end to said member on one side of said pinion, the other end of said spring being disposed on the opposite side of the pinion and bearing against the rack, a relatively light spring for opposing movement of the rack in opposite direction from normal position, and means rendering the first spring ineffective during said latter movement.

10. In a weighing scale, a horizontally disposed member mounted for movement in opposed directions in accordance with the application and removal of an object to be weighed, a lug carried by said member, a main weighing spring having one end fixedly anchored and its other end engaging said lug, whereby the movement of said member in one direction is opposed, and means resiliently maintaining said latter end of the spring in engagement with said lug.

11. In a portable weighing scale, a rocker member having corrugated opposite surfaces, knife edged bearing elements respectively disposed on opposite sides of said member with their knife edges spaced apart and each disposed in a groove of said corrugations, means supporting said elements for relative movements towards and away from each other, means limiting the away movement, means operative during a weighing operation to move said elements towards each other to rock said member in one direction, a weight indicating mechanism opposing the movement of said member in said one direction and resiliently maintaining said members at said limit of their movement during non-weighing operation, whereby the knife edges of said elements are retained against movement from their associated grooves irrespective of the position in which the scale is disposed.

12. In a weighing scale, a rocker member having a corrugated portion, bearing elements respectively disposed above and below the rocker member, each bearing element having a knife edge disposed in a corrugation groove, said knife edges being laterally spaced apart, mechanism including a main weighing spring acting to normally rock said member to relatively move the bearing elements apart, means limiting said movement of the bearing elements, and means responsive to the weight of an object to be weighed for relatively moving the bearing elements towards each other to rock said member in the opposite direction.

13. In a weighing scale, an equalizer plate longitudinally shiftable in response to the weight of an object placed on the scale, a bowed spring disposed flat on said plate with one end anchored thereon, abutment means normally retaining the free end of the spring against movement to an unstressed position of the spring, weight indicating means including a pinion, a rack member meshing with said pinion and swingably bearing at one end on the free end of said spring, and connection means between the rack member and the plate for resiliently retaining the said one end of the rack bearing against the free end of the spring and resiliently retaining the rack and pinion in mesh.

14. In a weighing scale, an equalizer plate longitudinally shiftable in response to the weight of an object placed on the scale, a bowed spring disposed flat on said plate with one end anchored thereon, abutment means normally retaining the free end of the spring against movement to an unstressed position of the spring, weight indicating means including a pinion, a rack member arranged for movement independently of the equalizer plate, said rack member meshing with the pinion and swingably bearing at one end on the free end of the spring, and a second spring connecting the rack member with the plate and acting to normally retain the bearing end of the rack against the free end of the first spring and swing the rack toward the pinion for resiliently retaining the rack and pinion meshed.

WILLIAM H. GREENLEAF.